Figure 9:
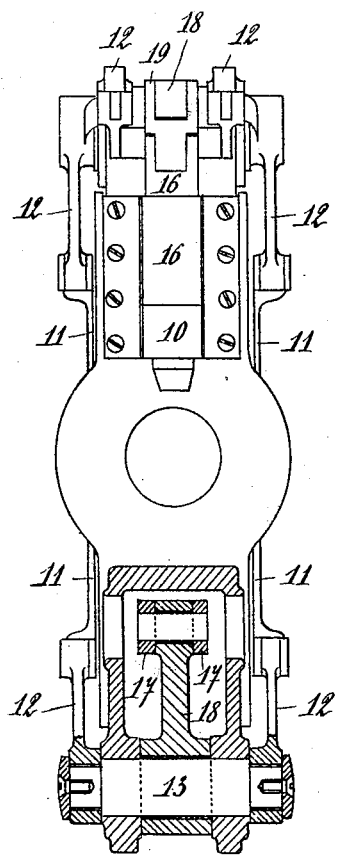

G. ERMEL.
RIVETING MACHINE.
APPLICATION FILED FEB. 27, 1906.
912,297.
Patented Feb. 16, 1909.
5 SHEETS—SHEET 1.
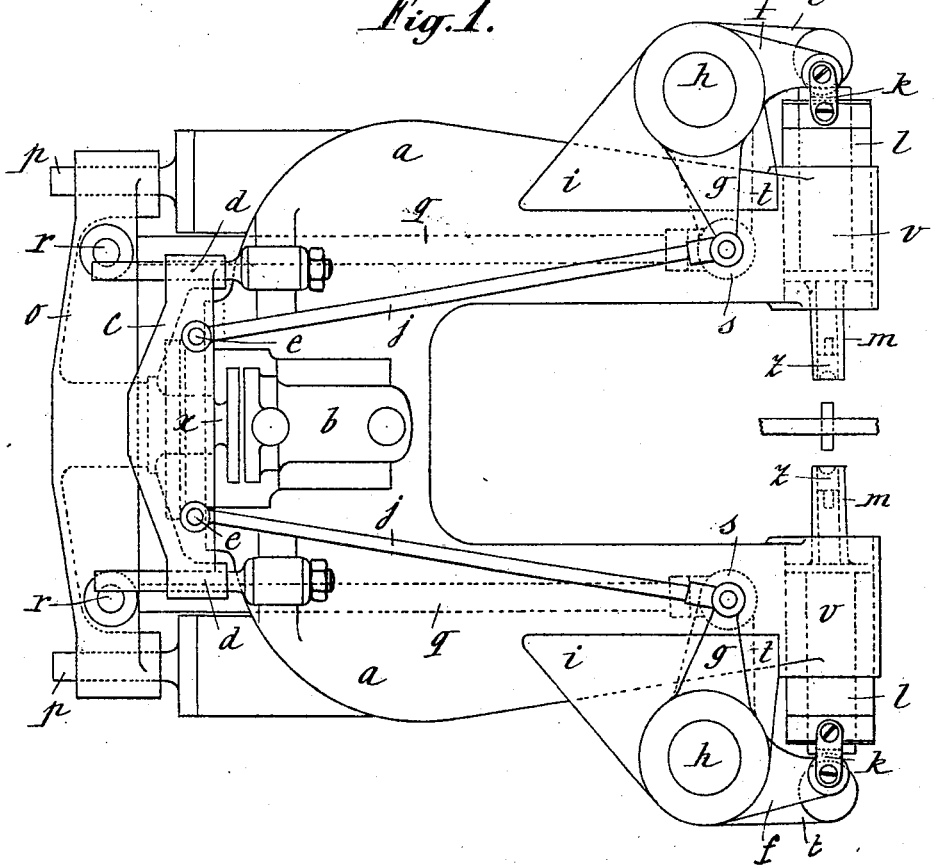
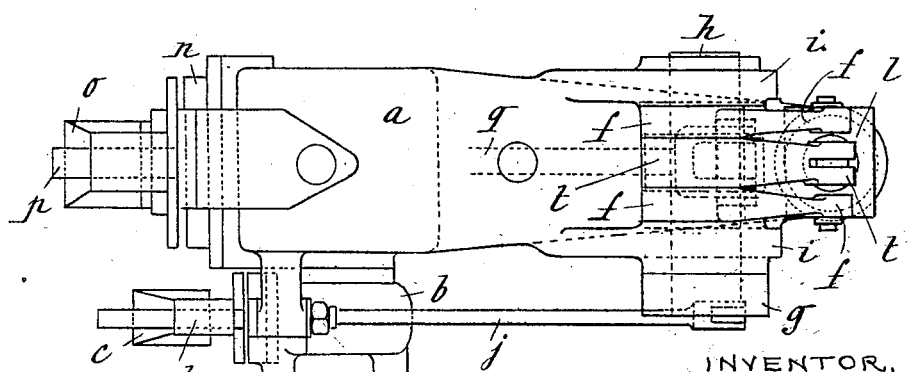
WITNESSES:
INVENTOR,
GEORGES ERMEL,
BY
ATTORNEY.

G. ERMEL.
RIVETING MACHINE.
APPLICATION FILED FEB. 27, 1906.
912,297.
Patented Feb. 16, 1909.
5 SHEETS—SHEET 2.
Fig. 2.
Fig. 6.
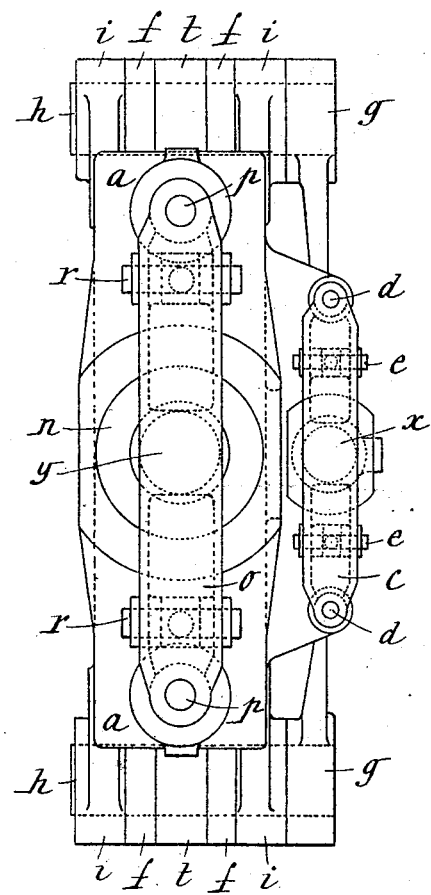
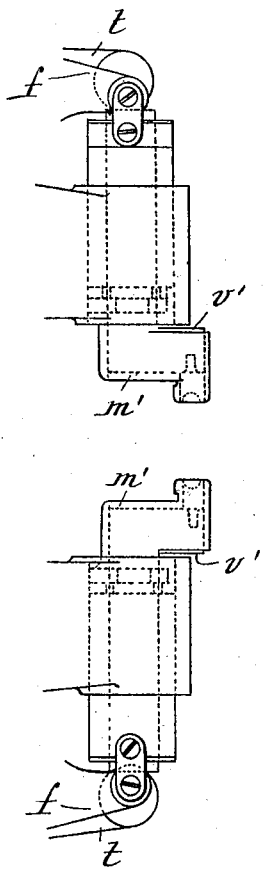
WITNESSES;
INVENTOR,
GEORGES ERMEL.
BY
ATTORNEY.

G. ERMEL.
RIVETING MACHINE.
APPLICATION FILED FEB. 27, 1906.
912,297.
Patented Feb. 16, 1909.
5 SHEETS—SHEET 3.
Fig. 4.
Fig. 5.
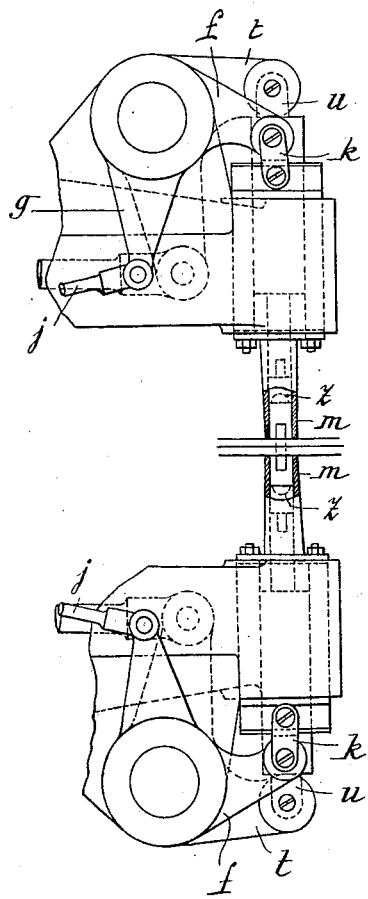
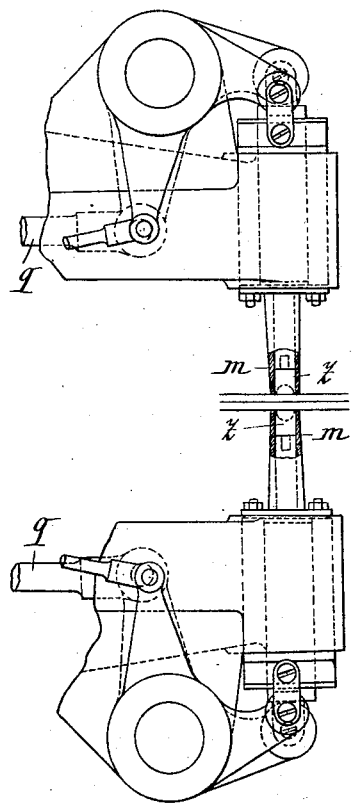
WITNESSES;
F. H. Logan
H. H. Berrigan.
INVENTOR,
GEORGES ERMEL,
BY H. van Isderweel
ATTORNEY.

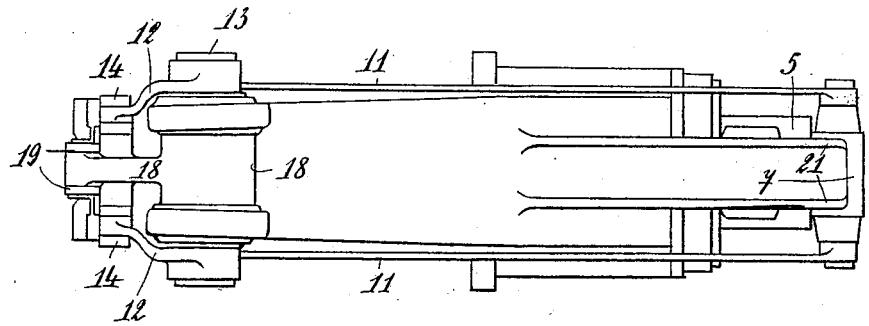
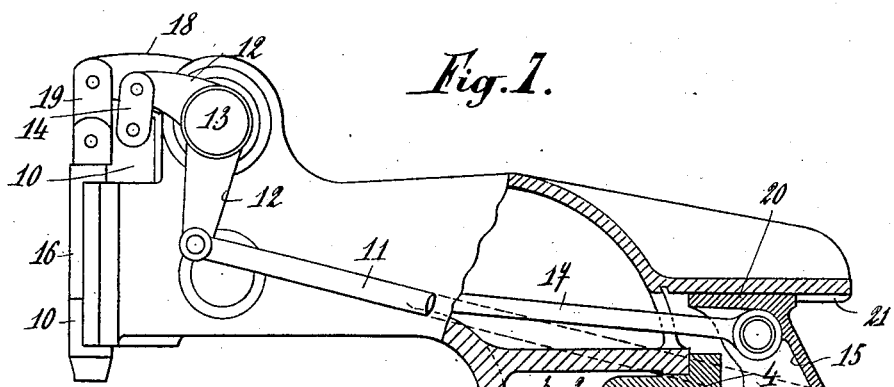
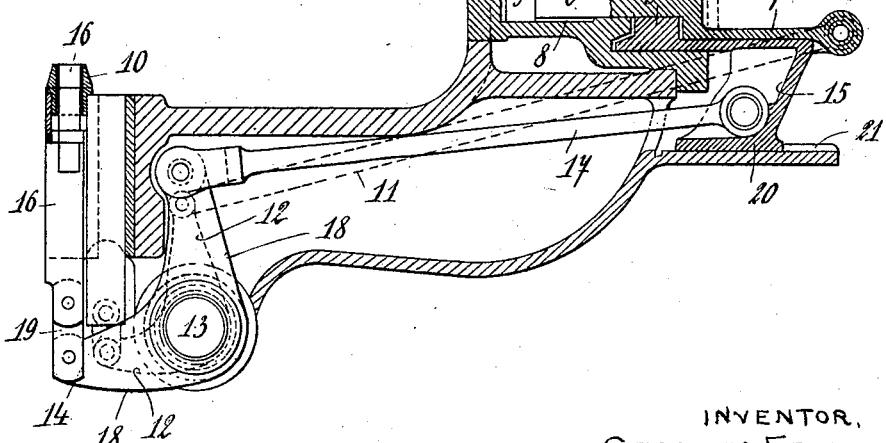

G. ERMEL.
RIVETING MACHINE.
APPLICATION FILED FEB. 27, 1906.

912,297.

Patented Feb. 16, 1909.
5 SHEETS—SHEET 5.

WITNESSES.
F H Logan
W. H. Berrigan.

INVENTOR,
GEORGES ERMEL,
BY H van Oldermeel
ATTORNEY

UNITED STATES PATENT OFFICE.

GEORGES ERMEL, OF LIEGE, BELGIUM.

RIVETING-MACHINE.

No. 912,297.  Specification of Letters Patent.  Patented Feb. 16, 1909.

Application filed February 27, 1906. Serial No. 303,315.

*To all whom it may concern:*

Be it known that I, GEORGES ERMEL, a subject of the King of the Belgians, and residing and having a post-office address at 40 Rue du Mont St. Martin, Liege, Belgium, have invented certain new and useful Improvements in Riveting-Machines, of which the following is a full and true description, reference being had to the accompanying drawings, which illustrate embodiments of my invention.

This invention relates to a new machine for riveting industrial constructions by the direct use of simple metal pins whose ends are crushed simultaneously.

The new machine is shown in the accompanying drawings, in which—

Figure 1 is an elevation of the apparatus at rest, Fig. 2 is a rear elevation, and Fig. 3 is a plan; Figs. 4 and 5 are two partial elevations of the ends of the machine, showing two different positions of the clamps and of the pressing pistons. Fig. 6 is a part elevation of the ends of the machine, showing a modification of the construction. Fig. 7 is a side elevation of a modification of the machine partly in section; Fig. 8 is a plan of the same modification and Fig. 9 is a front elevation partly in section.

The machine consists essentially of two sets of coupled parts, operated by any suitable power connections, the clamps on the one hand and the riveting pistons on the other, these parts operating in succession in order to effect the riveting. For this purpose the articles to be riveted are held and fixed at the place of the rivet by the two hollow clamps, in the interior of which are situated the ends of the pin intended to form the rivet.

Two pistons, sliding in the interior of these clamps and terminating in dies, then move so as to crush the ends of the pin and thus form the heads of the rivets.

The pair of clamps on the one hand and the pair of pressing pistons on the other hand, are actuated by two distinct and independent motors which as shown in the drawings are assumed to be hydraulic, compressed air or steam cylinders.

The small cylinder $b$ is carried by the horse-shoe shaped frame, $a$, of the machine, and actuates the clamps referred to. The cylinder $b$ is double-acting; its piston is connected by a rod $x$ to a cross-piece $c$ guided at its two ends $d$ on rods fixed to the frame. At the symmetrical points $e\ e$ of the crosspiece $c$ are attached two connecting rods $j$, jointed to levers $g$ keyed on axles $h$ rotating in bearings $i$ provided on the ends of the frame. On each of these axles $h$ are also keyed two arms $f$ connected by means of rods $k$ to two cylinders $l\ l$. On the inner faces of the cylinders $l$ are bolted the two interchangeable clamps $m$ which thus share in the alternate movements that are described by the cylinders $l$ in sliding in the ends of the framing.

The riveting pistons $v\ v$ terminating in interchangeable dies $z$ and adapted to slide with gentle friction in the interior of the cylinders $l$, are actuated in a similar manner to the latter; the outer ends of the pistons $v$ are united by links $u$, Fig. 4, to the bell crank levers $t\ t$ which turn on the axle $h$ between the arms $f\ f$. The second arm of each bell crank $t$ takes into an appropriate slot of the frame and its end is jointed to a link $q$ also situated in a slot in the frame. Each link $q$ is pivoted at is other end to a crosshead $o$ guided on two rods $p$. To the center of this crosshead is attached the rod $y$, Fig. 2, of a piston traveling in a double acting cylinder $n$ which is preferably situated in the back of the frame and is co-axial with the symmetrical axis of the latter.

The machine operates as follows: The parts to be riveted into which has been introduced the red-hot pin destined to form the rivet, are first brought to the proper position; then the motive fluid is admitted into the cylinder $b$ in such a manner as to move backwards the piston and its rod $x$, thus carrying in the same direction the crosspiece $c$ and the links $j$. In this manner the axles $h$ and their arms $f$ are turned through the arms $g$. As a result of this the cylinders $l$ move towards each other, Fig. 4, and the clamps $m$ surround the pin which is to be the rivet, and bring together the pieces to be riveted. When the latter are sufficiently close together, admission of the motive fluid into the cylinder $b$ is stopped, but none of the fluid already therein is allowed to escape. The riveting pistons $v$ are then actuated by causing the motive fluid to enter the cylinder $n$ in such a manner that the piston of the latter moves the crosshead $o$ backwards. This backward movement is transmitted through the links $q$ to the bell cranks $t$ which are thus moved on the axles $h$ so as to press towards each other the riveting pistons $v$, whereby the latter press upon the ends of the pin which is to form the rivet, Fig. 5, with a pressure depending partly on the quantity of the fluid admitted into the cylinder *n* and partly on the ratio of the two arms of the bell cranks *t*. This ratio can easily be regulated, for example, by slotting the depending arms of the bell cranks and connecting the links *q* with these arms by pins passing through the slots. By this construction the stroke of each of the pistons *v* can be adjusted independently of that of the other piston; when, for example, it is desirable to produce rivets of which the two heads have a different form or volume. When it is judged that the rivet has been sufficiently upset, the pressure which causes the forward movement of the pistons in the cylinders *b* and *n* is allowed to escape and motive fluid is admitted behind the pistons. The clamps *m* and the dies *z* move away from the now riveted parts and assume their original positions. Whatever the motive power may be, the two clamps are moved simultaneously but in opposite directions and with an equal power. As to the riveting pistons, they are also moved simultaneously in opposite directions; at the same time their stroke and their power can be the same or different, according as heads of the rivets are to be alike or are to be of different nature or volume.

It will be at once apparent that whatever may be the thickness of the parts to be riveted, the dies *z*, or the dies *z* and the clamps *m*, need only be changed when the rivet is to have a different form or volume. Finally, the clamps and the riveting pistons may have different forms according to the work to be done. Thus, instead of the form shown in Figs. 1 to 5, that indicated in Fig. 6 may be used, wherein the pistons *v'* are bent at right angles, and the clamps *m'* are correspondingly shaped, such a variation being necessitated by the kind of construction to be operated upon, for instance, when flanges of beams, bottoms of boilers and the like are to be riveted.

In the modification shown in Figs. 7, 8 and 9, both the driving mechanisms are situated co-axial with the machine, giving rise to certain advantages, particularly in respect of the lightness of the machine and the distribution of the work.

Within the back of the horse-shoe which constitutes the frame of the machine is a cylinder 2 which is co-axial with the machine and comprises a part 3 of shorter diameter than the rest of the cylinder 4. The part of larger diameter contains a piston 5, and the part of smaller diameter which may be termed the front part of the cylinder, contains a piston 6 whose rear end 7 is of enlarged cross section and slides with little friction within the first-named piston 5. The part of the piston 6 which is of smaller diameter is of smaller diameter than the cylinder 3, so that an annular chamber 8 is formed around it for the reception of the motive fluid. The piston 6 terminates at its front end in a head 9 which is of the same diameter as the cylinder 3. The piston 6 controls the two clamps 10 through four coupling links 11 which are arranged on each side of the machine and which actuate four bell cranks 12 mounted to turn respectively on the ends of the shafts 13 and connected with the clamps 10 by links 14. The larger piston 5 is in one piece with a yoke 15 which is connected with the riveting pistons 16 through two links 17, two bell cranks 18 mounted on the shafts 13 and two links 19. The riveting pistons 16 and the clamps 10 are in this case constructed as flat slides sliding one within the other. The ends of the yoke 15 are faced to slide in guides 21 made in one piece with the frame. The parts to be riveted having been brought into the desired position with the pin which is to form the rivet placed in the rivet holes, the motive fluid is admitted in front of the head of the piston 6. This piston is thus forced backwards through the transmission devices described, brings together the clamps 10 and presses the parts to be riveted around the rivet pin. The motive fluid is then admitted in front of the piston 5 which acts in like manner to bring together the riveting pistons 16 so as to upset the rivet. The motive fluid is then allowed to escape from under the pistons 5 and 6. As the motive fluid is constantly admitted into the annular chamber 8 it brings back the piston 6 and keeps it in its original position together with the piston 5 which follows piston 6, owing to the fact that the part 7 of the latter moves within it.

As in the case of the arrangement shown in Figs. 1 to 6, the modification just described may be varied in its details without departing from the essence of the invention.

Having thus described the nature of this invention and the best means I know of carrying the same into practical effect, I claim:—

1. A riveting machine comprising a pair of clamps, a source of power whereby the said clamps are caused to approach and to recede from each other, a pair of riveting pistons, a second source of power whereby the said pistons are caused to approach and to recede from each other, the said sources of power being situated in the middle plane of the machine, a crosshead actuated by the first-named source of power, a system of transmitting links connecting the said crosshead with the said clamps, a second crosshead actuated by the second-named source of power, and a system of transmitting links connecting the said second crosshead with the said pistons.

2. A riveting machine comprising a pair of clamps, a source of power and connections whereby the said clamps are caused to approach and to recede from each other, a pair of riveting pistons, and a second source of power and connections both independent of those first named, whereby the said pistons are caused to approach and to recede from each other, the said sources of power being situated co-axially with the axis of symmetry of the machine.

3. A riveting machine comprising a frame, a pair of clamps, a piston of small diameter carried by the frame, links connecting said piston with the said clamps, a pair of riveting pistons, a piston of larger diameter than and surrounding part of the first-named piston, and links connecting the piston of larger diameter with the riveting pistons.

In witness whereof I have hereunto set my hand in presence of two witnesses.

GEORGES ERMEL.

Witnesses:
JOHN LAFFIN,
P. BHIRIONET.